(12) United States Patent
Matsui (10) Patent No.: US 10,253,808 B2
(45) Date of Patent: Apr. 9, 2019

(54) CURVILINEAR ROLLING GUIDE UNIT AND METHOD OF LOADING ROLLING ELEMENTS INTO SLIDER THEREOF

(71) Applicant: NIPPON THOMPSON CO., LTD., Tokyo (JP)

(72) Inventor: Masashi Matsui, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 15/679,328

(22) Filed: Aug. 17, 2017

(65) Prior Publication Data

US 2018/0058501 A1   Mar. 1, 2018

(30) Foreign Application Priority Data

Aug. 31, 2016   (JP) .................................. 2016-168812

(51) Int. Cl.
*F16C 29/06*   (2006.01)
*F16C 29/08*   (2006.01)
*F16C 33/66*   (2006.01)
*F16C 43/06*   (2006.01)

(52) U.S. Cl.
CPC ........ *F16C 29/064* (2013.01); *F16C 29/0602* (2013.01); *F16C 29/0607* (2013.01); *F16C 29/0609* (2013.01); *F16C 29/086* (2013.01); *F16C 33/6659* (2013.01); *F16C 43/06* (2013.01); *F16C 2226/60* (2013.01)

(58) Field of Classification Search
CPC .............. F16C 29/0602; F16C 26/0607; F16C 29/0659; F16C 29/0609; F16C 29/086; F16C 29/005; F16C 33/6659; F16C 43/06; F16C 2226/60
USPC ... 384/13, 15, 43, 45, 49, 59, 451, 510, 537
See application file for complete search history.

(56) References Cited

U.S. PATENT DOCUMENTS

| | | | | |
|---|---|---|---|---|
| 6,019,513 A | * | 2/2000 | Tsukada | F16C 29/0642 384/15 |
| 6,547,437 B2 | * | 4/2003 | Kamimura | F16C 29/064 384/13 |
| 7,677,804 B2 | * | 3/2010 | Geka | F16C 29/0604 384/43 |

(Continued)

FOREIGN PATENT DOCUMENTS

| | | | | |
|---|---|---|---|---|
| DE | 102004007969 A1 | * | 10/2005 | .......... F16C 33/6659 |
| DE | 202016100480 U1 | * | 3/2016 | .......... F16C 33/6659 |

(Continued)

*Primary Examiner* — Marcus Charles
(74) *Attorney, Agent, or Firm* — Browdy and Neimark, PLLC (57) ABSTRACT

A curvilinear rolling guide unit allows a slider to readily straddle an endless guide rail and can prevent leakage of lubricant from a lubrication hole formed in each end cap. Each end cap is composed of an end cap body and a spacer. The end cap body has a lubrication hole, a lubrication groove, a slit which are formed in an upper portion thereof. The lubrication groove establish communication between the lubrication hole and turnaround passages. The slit extends from the lubrication hole to the under surface of the upper portion. A lubrication plug is fitted into the lubrication hole of the end cap body, closes the slit, and has a hole formed therein and serving as a lubrication passage communicating with the lubrication groove.

11 Claims, 11 Drawing Sheets

(56) References Cited

U.S. PATENT DOCUMENTS

| | | | | |
|---|---|---|---|---|
| 9,068,601 B2* | 6/2015 | Mizumura | ......... | F16C 33/6659 |
| 9,284,988 B2* | 3/2016 | Mizumura | .............. | F16C 43/06 |
| 2001/0017951 A1* | 8/2001 | Kamimura | ............ | F16C 29/064 |
| | | | | 384/45 |
| 2006/0231335 A1* | 10/2006 | Lin | .................... | F16C 29/0609 |
| | | | | 184/5 |
| 2013/0142458 A1* | 6/2013 | Nakagawa | ......... | F16C 29/0642 |
| | | | | 384/15 |
| 2017/0097047 A1* | 4/2017 | Chiu | .................. | F16C 33/6659 |

FOREIGN PATENT DOCUMENTS

| | | | | |
|---|---|---|---|---|
| JP | H0658234 U | | 8/1994 | |
| JP | H0802144 A | | 1/1996 | |
| JP | 2001241437 A | | 9/2001 | |
| JP | 2005257036 A | | 9/2005 | |
| JP | 2017032058 A | * | 2/2017 | .............. F16C 29/06 |
| WO | WO-2013114475 A1 | * | 8/2013 | .......... F16C 33/6659 |

\* cited by examiner

CURVILINEAR ROLLING GUIDE UNIT AND METHOD OF LOADING ROLLING ELEMENTS INTO SLIDER THEREOF

FIELD OF THE INVENTION

The present invention relates to a curvilinear rolling guide unit in which a slider moves on an endless guide rail through a plurality of rolling elements, and to a method of loading the rolling elements into the slider.

BACKGROUND OF THE INVENTION

A curvilinear rolling guide unit guides its slider which curvilinearly moves along its curvilinear guide rail via rolling elements, and has been used, in recent years, in sliding sections which perform a relative motion in machine tools, transport apparatus, industrial robots, transfer machines, assembling apparatus, semiconductor fabrication systems, etc. Conventionally, many curvilinear rolling guide units have been proposed, but have not yet been sufficiently commercialized.

The applicant of the present application developed a curvilinear rolling guide unit and filed a patent application for the curvilinear rolling guide unit (see, for example, Japanese Patent Application Laid-Open No. 2001-241437). In the curvilinear rolling guide unit, the slider which slides on the guide rail extending curvilinearly with a fixed curvature has a balanced structure and has a reduced size. Also, the curvilinear rolling guide unit allows application of end caps of the same design specifications thereto according to the design specifications of the slider. Even when the length of a carriage of the slider varies, the opposite end surfaces of the carriage are always contained in respective vertical planes which pass the center of curvature of the guide rail and vertically section the guide rail. Common design specifications can be imparted to end caps each having turnaround passages. Since rectilinear return passages are shifted inward of the carriage, the carriage does not have portions which are excessively thick in the radial direction of the guide rail, and the carriage can have a structure which is well balanced in the radial direction and is reduced in size.

Japanese Patent Application Laid-Open No. H08-21441 discloses a curvilinear motion guide device which can be assembled easily and accurately, exhibits high rigidity, and can provide an accurate, infinite curvilinear guide. In the curvilinear motion guide device, moving blocks are mounted on an endlessly formed endless annular guide rail through a large number of rolling elements. In order to mount each moving block on a portion of the endless guide rail, the guide rail is cut at a certain position to form a cut portion, and the end surfaces of the guide rail at the cut portion are shifted from each other, whereby the moving block can be attached to or detached from the guide rail through the cut portion of the guide rail.

Japanese Patent Application Laid-Open No. 2005-257036 discloses a stud type track roller having a lubrication plug. The lubrication plug can be easily attached to lubrication holes of existing stud type track rollers with almost no need to change design, can easily and reliably re-supply lubricant, is compact and easy to manufacture, and is of low cost. In the lubrication plug, a cylindrical large-diameter portion and a cylindrical small-diameter portion to be fitted into a lubrication hole of a stud are formed integrally with each other, and the large-diameter portion and the small-diameter portion have an injection hole extending along an axis and allowing insertion of a lubrication nozzle from the large-diameter portion into the small-diameter portion. An inner surface of the lubrication plug is tapered according to the shape of a grease gun to be used for lubrication so as to establish close contact between the inner surface of the lubrication plug and the outer surface of a tip of the grease gun for prevention of leakage during supply of lubricant.

Japanese Utility Model Application Laid-Open No. H06-58234 discloses a rectilinear motion guide unit whose end seal has a lubricant injection hole formed therein. In the rectilinear motion guide unit, a lubricant injector is inserted into the lubricant injection hole of the end seal, and lubricant is injected through the lubricant injection hole. After completion of lubrication, the lubricant injector is removed from the end seal; as a result, the lubricant injection hole in the form of a pore closes, thereby preventing leakage of grease.

Conventionally, since a curvilinear rolling guide unit is such that a guide rail extends endlessly with a fixed curvature, or in an irregularly curved form, the structure of a slider used in a conventional rectilinear rolling guide unit cannot be applied to the curvilinear rolling guide unit. Specifically, in the conventional curvilinear rolling guide unit, the slider cannot have a structure which is well balanced and is reduced in size, for the following reasons: load-carrying races extend curvilinearly similar to the guide rail, and, in order to allow formation of return passages, the slider must have wasteful wall thickness on the radially inner and outer sides thereof. Also, in the curvilinear rolling guide unit, preparation of end caps of different design specifications in accordance with a change in the curvature of the guide rail or a change in the overall length of the slider results in an increase in the number of components and complication of management. Thus, a problem has been how to provide a curvilinear rolling guide unit in which a slider slides on a guide rail extending curvilinearly with a fixed curvature with a structure which is well balanced and is reduced in size; which allows use of end caps of the same design specifications even when the curvature of the guide rail and the overall length of the slider are changed; and which enables simple management of components.

According to a conventional curvilinear rolling guide unit, if a guide rail of endless type is employed, a slider cannot be mounted on the guide rail. Specifically, the slider is generally composed of a carriage, end caps attached to the opposite ends of the carriage, and end seals attached to end surfaces of the end caps. The carriage is formed of an upper portion and a pair of wing portions extending downward from opposite side portions of the upper portion, and a recess having a width equal to or greater than that of the guide rail is formed between the wing portions; thus, the carriage can straddle the guide rail to thereby be mounted thereon. In contrast, although the end cap is formed of an upper portion and a pair of wing portions extending downward from opposite side portions of the upper portion, since the wing portions have respective scooping portions having scooping beaks extending inward for guiding rolling elements which roll from load-carrying races to respective turnaround passages, the width between the scooping portions is narrower than the width of the guide rail; as a result, the end cap cannot straddle the guide rail as it is. Thus, as disclosed in the above Japanese Patent Application Laid-Open No. 2001-241437, the end cap has a slit which extends from a lubrication hole formed in its upper portion at the center to the under surface thereof. The end cap is elastically deformed at a thin wall portion located above the lubrication hole by external force so as to expand the width between the wing portions, whereby the end cap can straddle the guide rail to thereby be mounted thereon. However, the following problem has been found. When lubricant is supplied to the slider by use of a lubricator in such a manner that the nozzle of the lubricator is inserted into the lubrication hole of the end cap, lubricant leaks through the slit extending from the lubrication hole.

SUMMARY OF THE INVENTION

The present invention has been conceived to solve the above problem, and an object of the present invention is to provide a curvilinear rolling guide unit configured such that: a slider can be mounted on an endless guide rail; an end cap can be disposed on the guide rail in a straddling manner by elastically deforming the end cap for expanding the width between scooping portions provided at respective wing portions of the end cap and protruding toward the guide rail, the width being narrower than the width of the guide rail; in order to elastically deform the end cap, a slit is formed in the end cap in such a manner as to extend from a lubrication hole formed in an upper portion of the end cap in a central region with respect to a width direction to the under surface of the upper portion facing the guide rail; in order to prevent leakage of lubricant through the slit during supply of lubricant to the slider, a lubrication plug is fitted into the lubrication hole; and in lubricating work, in order to prevent leakage of lubricant through the slit, the lubrication plug is fitted in position into the lubrication hole of the end cap, and the nozzle of a lubricator is inserted into a hole of the lubrication plug, followed by supply of lubricant to the slider.

Further, an object of the present invention is to achieve the following: in the curvilinear rolling guide unit, the end cap can straddle the guide rail by elastically deforming the end cap at a thin wall portion located above the lubrication hole by external force so as to expand the width between the wing portions; i.e., the width between the scooping portions, whereby the slider can be disposed on the guide rail in a straddling manner at any position along the guide rail, and loading of rolling elements into the slider is facilitated.

Means to Solve the Problems

The present invention provides a curvilinear rolling guide unit comprising an elongated guide rail having first raceway grooves formed in an inner longitudinal side and an outer longitudinal side, and a slider which straddles the guide rail and slides thereon via rolling elements. The slider has a carriage, end caps, and a plurality of rolling elements. The carriage has second raceway grooves formed therein and facing the first raceway grooves of the guide rail and has return passages formed therein and extending along load-carrying races formed between the first raceway grooves and the second raceway grooves. The end caps are attached to respective opposite end surfaces of the carriage. Each of the end caps has a pair of turnaround passages formed therein and establishing communication between the load-carrying races and the return passages. The plurality of rolling elements roll in circulation passages. Each of the circulation passages is composed of the load-carrying race, the return passage, and a pair of the turnaround passages. In the curvilinear rolling guide unit, each of the end caps comprises an end cap body and a spacer. The end cap body is formed of an upper portion located above the guide rail, and wing portions extending downward from opposite longitudinal side portions of the upper portion along the inner longitudinal side and the outer longitudinal side of the guide rail.

The wing portions have scooping portions protruding inward in a width direction and outer wall surfaces of the turnaround passages. The spacer is in contact with a carriage-side end surface of the end cap body and has inner wall surfaces of the turnaround passages. The end cap body has a lubrication hole, a lubrication groove, and a slit formed in an upper portion thereof. The lubrication hole is formed in a central region of the upper portion. The lubrication groove establishes communication between the lubrication hole and the turnaround passages. The slit extends from the lubrication hole to an under surface of the upper portion. A lubrication plug is fitted into the lubrication hole formed in the end cap body, closes the slit, and has a lubrication passage formed therein and communicating with the lubrication groove.

The lubrication plug has a cylindrical outer circumference capable of being fitted into the lubrication hole formed in the end cap body. Further, the lubrication plug has a positioning protrusion fitted into the lubrication groove or the slit formed in the end cap body for positioning the lubrication plug at a predetermined position of the end cap body.

The lubrication passage formed in the lubrication plug includes a lubrication opening formed in one end surface of the lubrication plug, a hole extending through the lubrication plug from the lubrication opening to the other end surface of the lubrication plug, and a pair of lubrication grooves extending from a portion of the hole located at the other end surface to the outer circumference and communicating with the lubrication groove formed in the end cap body. The other end surface of the lubrication plug is in contact with an end surface of the spacer, thereby sealing a spacer-side end of the hole and defining the lubrication passage.

The spacer of the end cap is disposed in contact with the end cap body, thereby sealing the lubrication hole and the lubrication groove formed in the end cap body and defining the lubrication passage.

Each of end seals disposed on the respective end surfaces of the end caps comprises a seal member having a through hole formed therein at a position corresponding to the lubrication hole, and a metallic core halved at a position of the through hole and fixedly attached to the seal member.

The hole formed in the lubrication plug is formed of a taper hole portion reducing in diameter toward the lubrication groove, and a pore part smaller in diameter than a tip of the taper hole portion. Alternatively, the hole formed in the lubrication plug is formed straight.

The guide rail is formed into an arc shape and/or an endless ring shape. The carriage is formed in accordance with the shape of the guide rail such that a dimension along a longitudinal direction on an outer side is longer than a dimension along the longitudinal direction on an inner side. The end cap is formed such that the upper portion has the same dimension along the longitudinal direction on the inner side and the outer side and such that the wing portion on the inner side and the wing portion on the outer side have the same dimension along the longitudinal direction.

The present invention provides a method of loading rolling elements into the slider of the curvilinear rolling guide unit, comprising: disposing one of the end cap bodies on the guide rail in a straddling manner while expanding a width between the wing portions of the one end cap body; fitting the lubrication plug into the lubrication hole of the one end cap body; disposing the spacer and the carriage on the carriage-side end surface of the one end cap body; loading the rolling elements into the return passages, the load-carrying races, and the turnaround passages of the one end cap body; disposing the other end cap body on the guide rail in a straddling manner while expanding a width between the wing portions of the other end cap body; fitting the lubrication plug into the lubrication hole of the other end cap body; loading the rolling elements into the turnaround passages of the other end cap body; disposing the spacer on the carriage-side end surface of the other end cap body; and fixing the other end cap body to the carriage.

Further, in the case where end seals are disposed on the end surfaces of the end caps, one of the end seals is disposed on the other end surface of the one end cap body, and the one end cap and the one end seal are disposed on the carriage, and the other end seal is disposed on the other end surface of the other end cap body, and the other end cap and the other end seal are disposed on the carriage.

Effects of the Invention

Since the curvilinear rolling guide unit of the present invention is configured as mentioned above, merely by forming a slit in a conventional end cap body in such a manner as to extend from a lubrication hole formed at the center of an upper portion of the end cap body to the under surface of the upper portion, the end cap body can be elastically deformed in such a manner that the width between scooping portions of the end cap body becomes greater than the width of the guide rail, whereby the end cap body can be assembled to the guide rail from above. Further, by fitting the lubrication plug having the lubrication passage formed therein into the lubrication hole of the end cap body, leakage of lubricant from the slit can be prevented during supply of lubricant from a lubricator to the slider. In this manner, the conventional end cap can be readily utilized. Since the slit is merely formed in the conventional end cap body in a region located under the lubrication hole, after being assembled to the guide rail from above, the end caps are restored to their original shapes and can be easily attached to respective end surfaces of the carriage without need to increase attaching screws. Also, since the slider can be assembled to, i.e., be disposed, on the guide rail in a straddling manner at any desired position of an upper portion of the guide rail and since the slider can be easily detached from the guide rail at any position of the guide rail, and further since the slider can be lubricated as desired, for example, a new slider can be additionally attached to an endless guide rail between existing sliders. Further, merely by fitting the lubrication plug into the lubrication hole of the end cap body with its positioning protrusion fitted into the lubrication groove or the slit of the end cap body, the pair of lubrication grooves of the lubrication plug coincide with the lubrication groove of the end cap body, whereby a smooth lubrication passage can be easily formed.

BRIEF DESCRIPTION OF THE DRAWING

FIGS. 12(A)-12(C) are views of a lubrication plug fitted into the lubrication hole of the end cap in the curvilinear rolling guide unit of FIG. 1, where

FIGS. 14(A)-14(C) are views of a lubrication plug of another type.

FIGS. 15(A)-15(B) are views of a lubrication plug of a further type.

FIGS. 16(A)-16(C) are views showing another example of the end seal in the curvilinear rolling guide unit of FIG. 1.

DETAILED DESCRIPTION OF THE EMBODIMENT

Embodiments of a curvilinear rolling guide unit and a method of loading rolling elements into a slider thereof according to the present invention will next be described with reference to the drawings. The curvilinear rolling guide unit and the method of loading the rolling elements into the slider thereof are preferably applied to sliding sections in various apparatus such as semiconductor fabrication systems and precision machinery.

Figure 1:
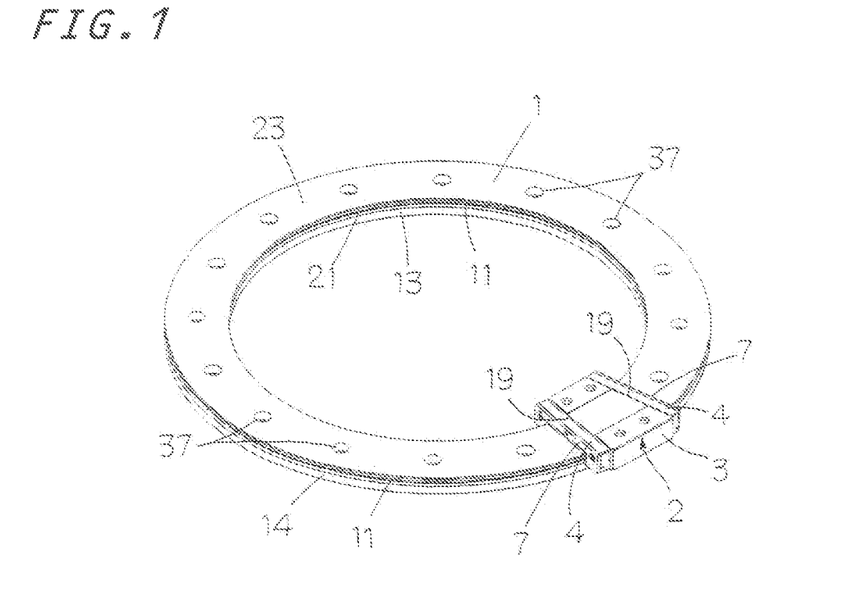
FIG. 1 is a perspective view showing a curvilinear rolling guide unit according to the present invention.
Figure 2:
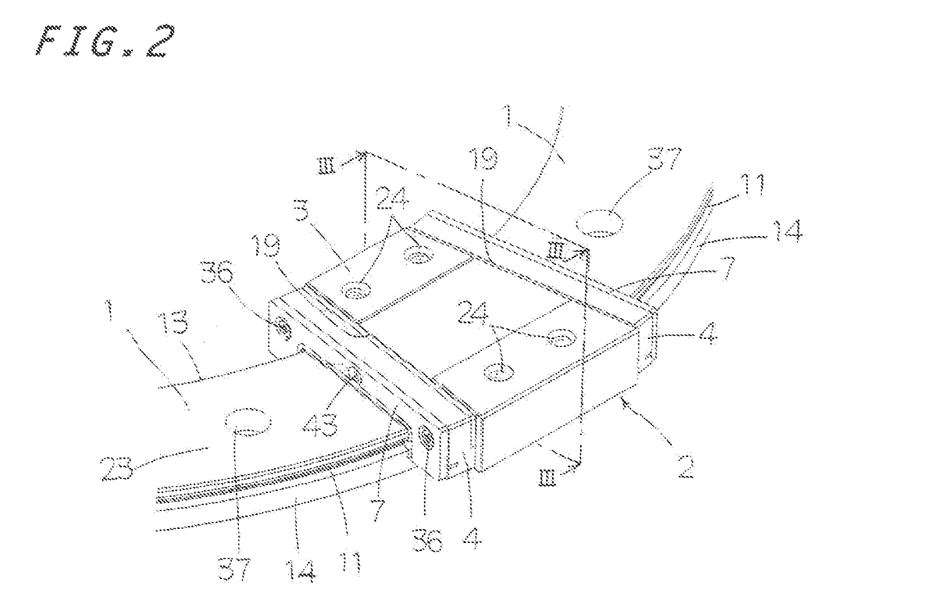
FIG. 2 is a perspective view showing, on an enlarged scale, a slider region in the curvilinear rolling guide unit of FIG. 1.
Figure 3:
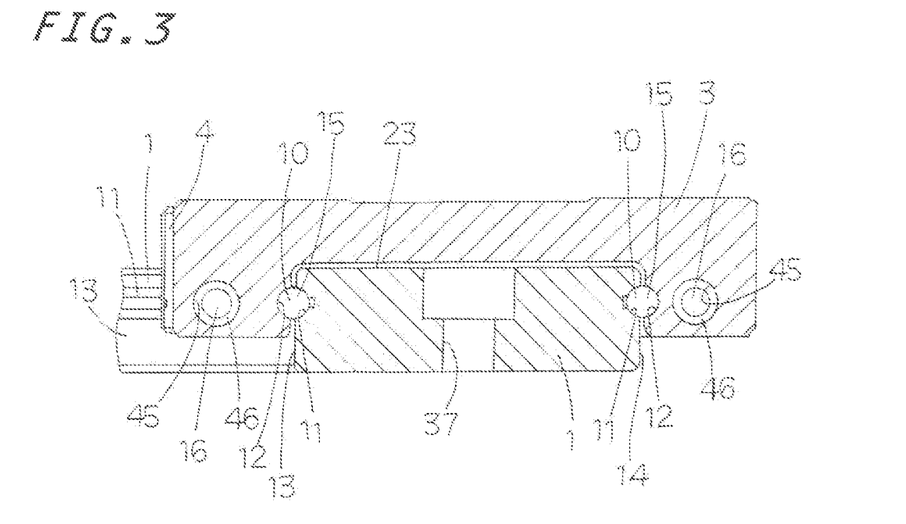
FIG. 3 is a sectional view of the curvilinear rolling guide unit taken along line III-III of FIG. 2.
Figure 4:
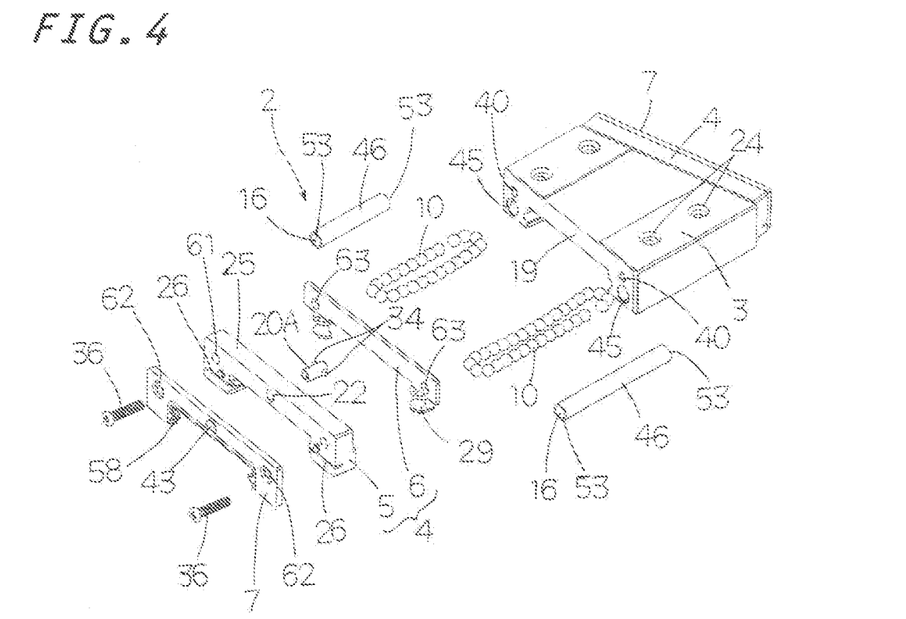
FIG. 4 is an exploded perspective view of the slider of the curvilinear rolling guide unit of FIG. 1.
Figure 5:
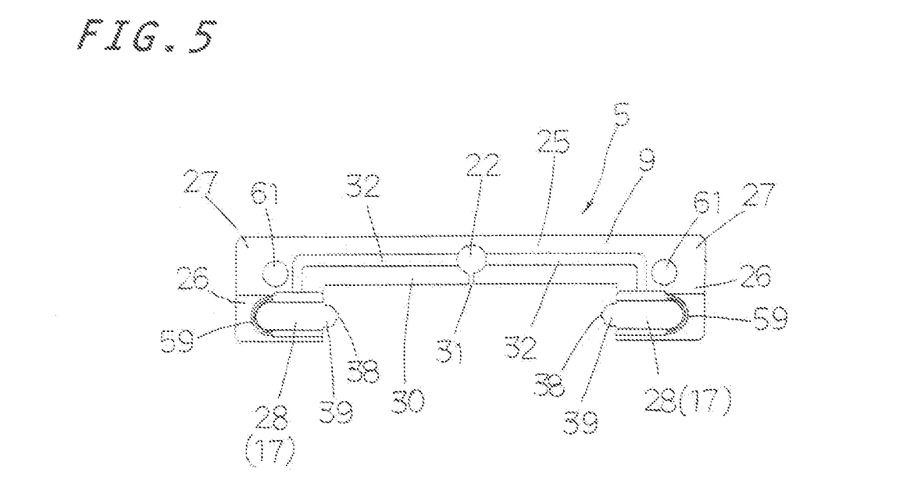
FIG. 5 is a rear view of an end cap body in the curvilinear rolling guide unit of FIG. 1 as viewed from a carriage side.
Figure 6:
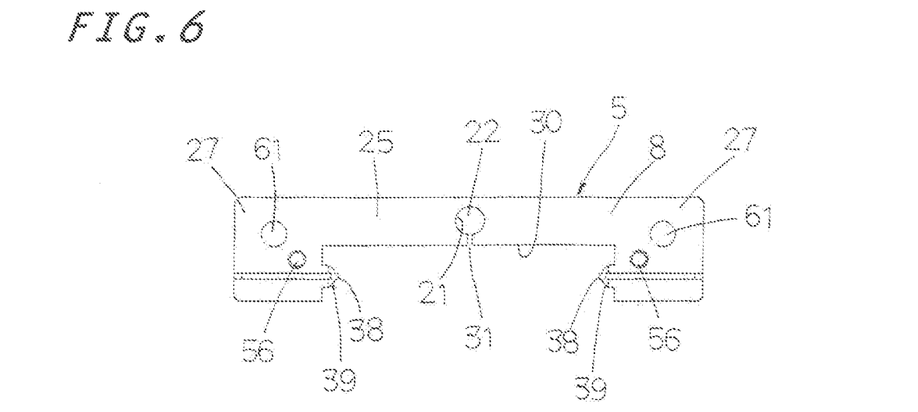
FIG. 6 is a front view of the end cap body of FIG. 5.
Figure 7:
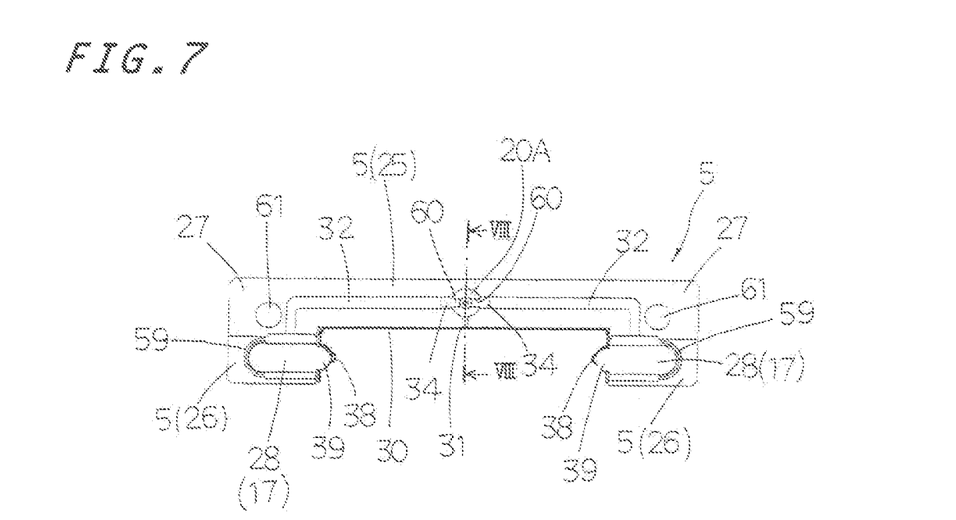
FIG. 7 is a rear view of the end cap body in the curvilinear rolling guide unit of FIG. 1 with a lubrication plug fitted into a lubrication hole of an end cap as viewed from the carriage side.

As shown in FIGS. 1 to 4, the curvilinear rolling guide unit according to the present invention is generally composed of an elongated guide rail 1 having raceway grooves 11 (first raceway grooves) formed in inner and outer longitudinal sides 13 and 14, respectively, and a slider 2 which straddles the guide rail 1 and can slide on the guide rail 1 via rolling elements; i.e., balls 10. The slider 2 has a carriage 3 which has raceway grooves 12 (second raceway grooves) formed therein and facing the raceway grooves 11 of the guide rail 1 and has return passages 16 formed therein and extending along load-carrying races 15 formed between the raceway grooves 11 and the raceway grooves 12, end caps 4 attached to respective opposite end surfaces 19 of the carriage 3 and each having arc-like turnaround passages 17 formed therein and establishing communication between the load-carrying races 15 and the return passages 16, end seals 7 disposed on respective opposite end surfaces 8 of the end caps 4 and each having lips 58 facing the guide rail 1, and a plurality of the balls 10 rolling in circulation passages each composed of the load-carrying race 15, the return passage 16, and a pair of the turnaround passages 17. The guide rail 1 has a plurality of holes 37 used to mount the same on a bed, a base of other equipment, or the like, extending therethrough from an upper surface 23 to a bottom surface thereof, and disposed along a longitudinal direction. The carriage 3 has a plurality of threaded holes 24 (four in FIG. 2) formed in an upper surface 35 and used to mount a counterpart member (not shown) thereon. Examples of the counterpart member include various devices, a workpiece, a mounting member, etc. The return passages 16 are formed in the carriage 3 such that sleeves 46 are fitted into respective openings 45 formed in the carriage 3 and extending in the longitudinal direction, whereby through holes of the sleeve 46 serve as the return passages 16. The sleeves 46 are formed of a porous molded member impregnated with lubricant and serve as lubrication members capable of lubricating the balls 10 rolling in the return passages 16. The slider 2 is configured such that the end seals 7 and the end caps 4 are unitarily fixed to the carriage 3. Specifically, the slider 2 is configured as follows: fastening screws 36 are inserted through holes 62 of the end seals 7, holes 61 of end cap bodies 5, and holes 63 of spacers 6 and are then screwed into threaded holes 40 of the carriage 3, thereby unitarily fixing the end caps 4 and the end seals 7 to the carriage 3. In this embodiment of the curvilinear rolling guide unit, for example, the guide rail 1 is formed into an endless ring shape as shown in FIG. 1 or an unillustrated arc shape. As shown in FIGS. 1, 2, and 4, in order to match the shape of the guide rail 1, the carriage 3 is formed into a fan shape such that its longitudinal dimension on the outer side is greater than its longitudinal dimension on the inner side. As shown in FIGS. 1, 2, 4, and 9, the end cap 4 is formed such that the dimension of an upper portion 25 measured on the inner side along the longitudinal direction is equal to the dimension of the upper portion 25 measured on the outer side along the longitudinal direction and such that a wing portion 26 on the inner side and a wing portion 26 on the outer side have the same dimension measured along the longitudinal direction. The curvilinear rolling guide unit is configured such that as a result of the carriage 3 being formed into a fan shape so as to match the shape of the guide rail 1, the slider 2 can smoothly slide on the guide rail 1 in a reciprocating manner.

As shown in FIGS. 5 to 9, the end cap 4 is formed of the upper portion 25 located above the guide rail 1, and a pair of the wing portions 26 extending downward from opposite longitudinal side portions 27 of the upper portion 25 along the longitudinal sides 13 and 14 of the guide rail 1. The end cap 4 has connection convex portions 59 (59A, 59B) protruding from a carriage 3-side end surface 9 at positions of the turnaround passages 17. The connection convex portions (59A, 59B) are fitted into respective openings 45 formed in the carriage 3 and come into contact with end surfaces 53 of the sleeves 46 used to form the return passages 16 in the carriage 3, whereby the return passages 16 smoothly communicate with the turnaround passages 17. That is, the sleeves 46 inserted into the respective openings 45 formed in the carriage 3 come into contact with the connection convex portions (59A, 59B) at their end surfaces 53, thereby establishing smooth communication between the turnaround passages 17 and the return passages 16. The end cap 4 is composed of an end cap body 5 having outer wall surfaces 28 of the turnaround passages 17 formed in the wing portions 26 of the end cap 4, and a spacer 6 in contact with the carriage-side end surface 9 of the end cap body 5 and having inner wall surfaces 29 of the turnaround passages 17. The end cap 4 and the end seal 7 are assembled together such that the end seal 7 is positioned in relation to the end cap 4 by positioning projecting portions 56 formed on the end cap body 5 being fitted into positioning concave portions 57 formed in the end seal 7. The turnaround passages 17 are formed such that the outer wall surfaces 28 and the inner wall surfaces 29 are aligned with each other as a result of the spacer 6 coming fixedly in contact with the end cap body 5 over the entire surface of the spacer 6. The spacer 6 of the end cap 4 is disposed in contact with the end cap body 5, thereby sealing a lubrication hole 22 and a lubrication groove 32 which are formed in the end cap body 5. A recess having a width equal to or greater than that of the guide rail 1 is formed between the wing portions 26 of the end cap body 5. However, since the wing portions 26 of the end cap body 5 have respective scooping portions 39 having scooping beaks 38 extending inward toward the raceway grooves 11 of the guide rail 1 for guiding the balls 10 which roll from the load-carrying races 15 to the respective turnaround passages 17, the width between the scooping portions 39 of the end cap 4 is narrower than the width of the guide rail 1. Therefore, the end cap 4 cannot be disposed on the guide rail 1 in a straddling manner as it is.

The curvilinear rolling guide unit according to the present invention is characterized particularly in that the end cap body 5 has the lubrication hole 22 formed in a central region of the upper portion 25, the lubrication groove 32 establishing communication between the lubrication hole 22 and the turnaround passages 17, and a slit 31 extending from the lubrication hole 22 to an under surface 30 of the upper portion 25 of the end cap body 5 and that a lubrication plug 20A closing the slit 31 and having a hole 33 serving as a lubrication passage communicating with the lubrication groove 32 is fitted into the lubrication hole 22 formed in the end cap body 5. Since the end cap 4 has the slit 31 extending from the lubrication hole 22 formed in a central region of the upper portion 25 to the under surface 30 of the upper portion 25, a portion of the upper portion 25 located above the lubrication hole 22 is thin-walled. Accordingly, the end cap 4 can be elastically deformed and bent about the thin-walled portion of the upper portion 25 located above the lubrication hole 22; as a result, the end cap 4 can be disposed on the guide rail 1 in a straddling manner. The end seal 7 has protrusions 60 protruding inward toward the raceway grooves 11 of the guide rail 1. Since a seal member 41 of the end seal 7 is formed thin from synthetic rubber, in disposing the end seal 7 on the guide rail 1 in a straddling manner, the end seal 7 is twisted and fitted onto the guide rail 1 so as to straddle the guide rail 1.

Figure 8:
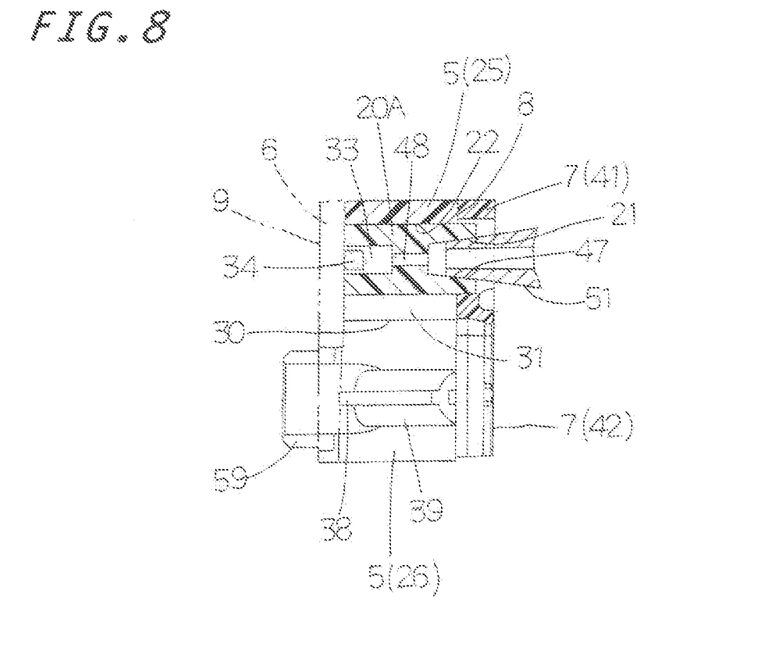
FIG. 8 is a sectional view of the end cap taken along line VIII-VIII of FIG. 7, showing a state in which the nozzle of a lubricator is fitted into the lubrication plug.
Figure 9:
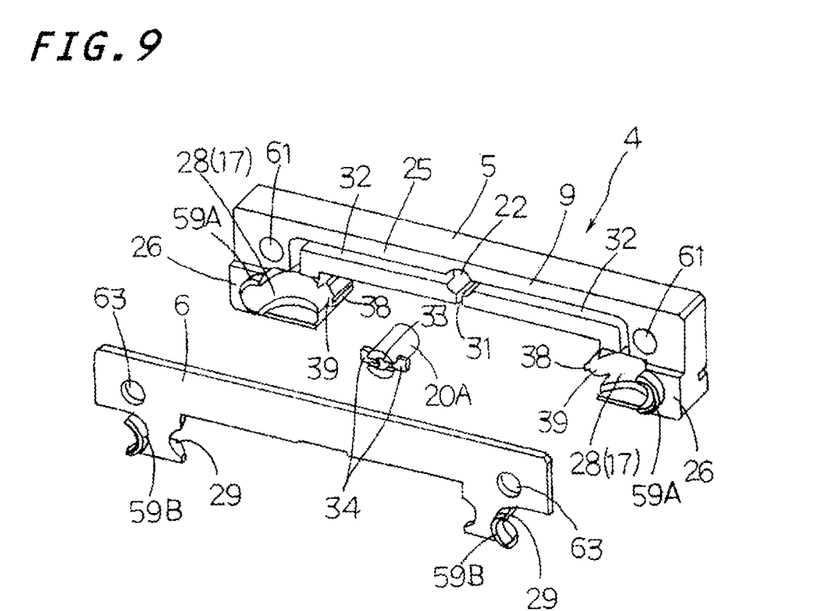
FIG. 9 is a perspective view for explaining a state in which the lubrication plug is to be fitted into the end cap.

As shown in FIGS. 7 to 9 and FIGS. 12A and 12B, the lubrication plug 20A, which is one embodiment of the lubrication plug according to the present invention, has the hole 33 formed therein and forming a lubrication passage for supply of lubricant and has positioning protrusions 34 which are fitted into the lubrication groove 32 formed in the end cap body 5 for positioning the lubrication plug 20A at a predetermined position of the end cap body 5. The lubrication plug 20A is formed into a cylindrical shape from a synthetic rubber material such as NBR (a copolymer of butadiene and acrylonitrile). The positioning protrusions 34 are fitted into the lubrication groove 32 formed in the end cap body 5, and the bottom surfaces of the positioning protrusions 34 partially constitute a communicating groove 52 communicating with the lubrication groove 32. As shown in FIG. 8, the hole 33 formed in the lubrication plug 20A and collectively serving as a lubrication passage are composed of, for example, a taper hole portion 47 serving as an opening into which a nozzle 51 of a lubricator 50 serving as a lubricator injector is fitted, a pore part 48 communicating with the taper hole portion 47 and formed into such a size as to check reverse flow of lubricant, and the communicating groove 52 establishing communication between the pore part 48 and the lubrication groove 32 formed in the end cap body 5. The lubricator 50 has a connection portion 54 at one end for connection to a lubricant supply source, and the nozzle 51, at the other end, to be engaged with a lubrication opening 21 of the lubrication plug 20A. In the lubrication plug 20A, the lubrication opening 21 into which the lubricant 50 serving as an injector is fitted is formed at the taper hole portion 47. The taper hole portion 47 has, for example, a taper angle smaller than a tip angle of the nozzle 51 of the lubricator 50, whereby the outer surface of the inserted nozzle 51 can come into close contact with the taper surface of the taper hole portion 47; as a result, leakage of lubricant through a gap between the taper hole portion 47 and the nozzle 51 can be prevented in injecting lubricant. In the case where the hole 33 formed in the lubrication plug 20A includes the pore part 48, a through hole 43 formed in the end seal 7 does not need to have a small size, since the pore part 48 of the lubrication plug 20A prevents reverse flow of lubricant. In an embodiment shown in FIGS. 10 and 11, the through hole 43 is formed into an elongated hole which is elongated in a width direction. Since the through hole 43 of the end seal 7 is formed into an elongated hole, the position of the end seal 7 in relation to the slider 2 can be finely adjusted in the width direction of the guide rail 1; thus, the same end seal 7 can be applied to the guide rail 1 having a different width, thereby contributing to common use of components.

Figure 14A:
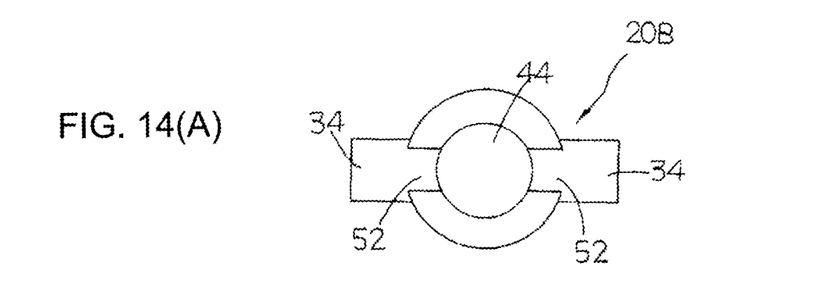
FIG. 14(A) is a rear view of a lubrication plug, FIG. 14(B) s a side view of the lubrication plug.
Figure 14B:
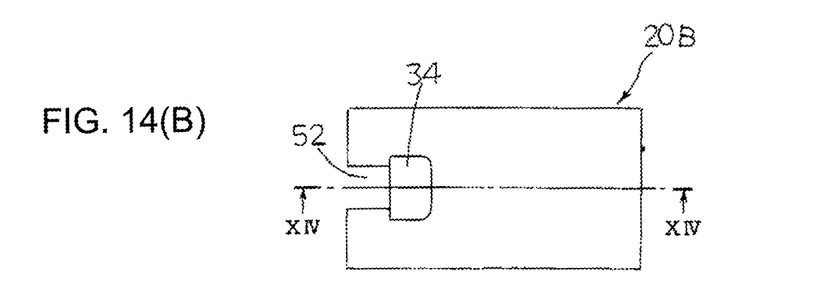
Figure 14C:
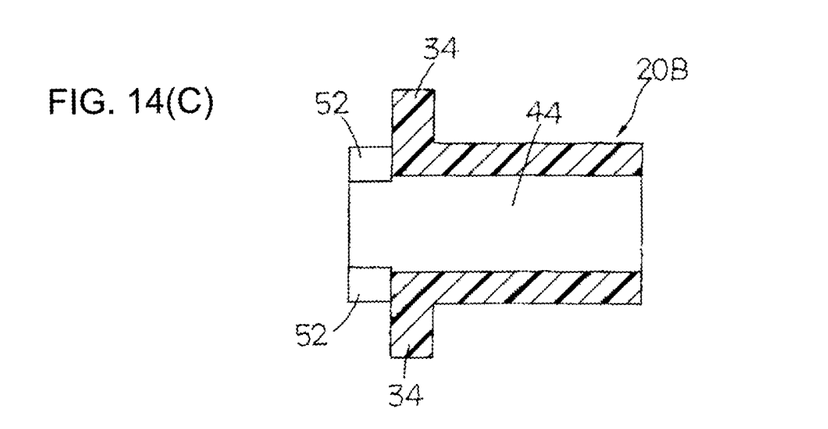
FIG. 14(C) is a sectional view of the lubrication plug taken along line XIV-XIV of FIG. 14(B), showing a hole of the lubrication plug.
Figure 16A:
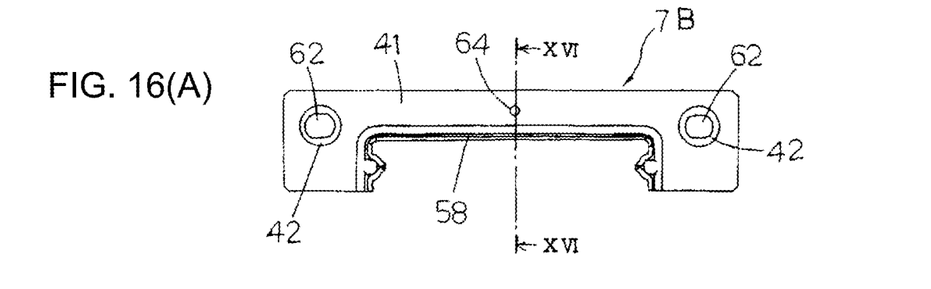
FIG. 16(A) is a front view showing another example of the end seal.
Figure 16B:
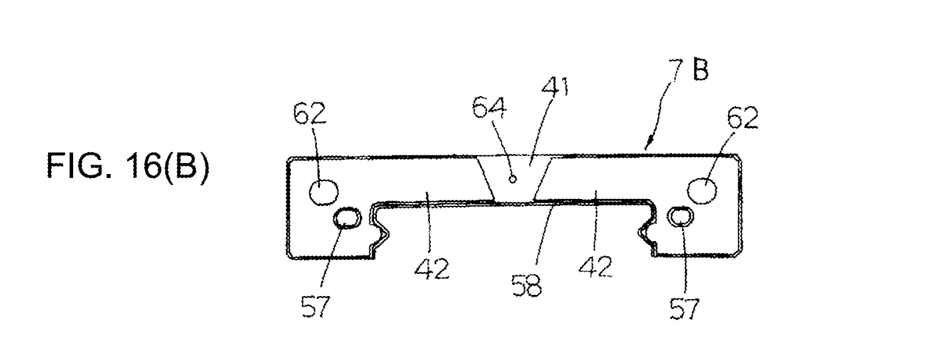
FIG. 16(B) is a rear view of the end seal.
Figure 16C:
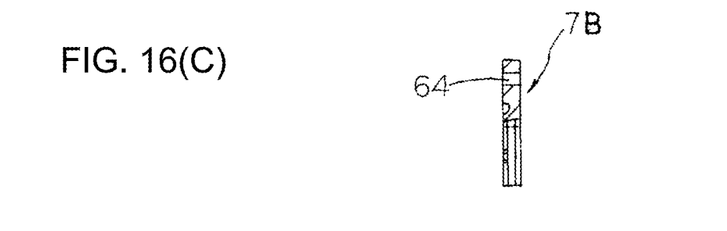
FIG. 16(C) is a sectional view of the end seal taken along line XVI-XVI of (A).

Another embodiment of the lubrication plug according to the present invention is a lubrication plug 20B shown in FIGS. 14A to 14C. The lubrication plug 20B has a straight hole 44 formed therein as shown in FIGS. 14A to 14C. In the case of employment of the straight hole 44 formed in the lubrication plug 20B, lubricant can be smoothly supplied. In the case of employment of the straight hole 44 formed in the lubrication plug 20B, as shown in FIGS. 16A to 16C, preferably, the through hole 43 formed in the end seal 7B is reduced in size to thereby assume the form of a pore 64 in order to prevent reverse flow of lubricant. The pore 64 of the end seal 7B shown in FIGS. 16A to 16C is usually in an almost closed condition. The fine nozzle 51 located at the tip of the lubricator 50 elastically expands the pore 64 and is thus inserted into the pore 64 for lubrication. When the lubricator 50 is extracted from the pore 64, the pore 64 is closed.

Figure 15A:
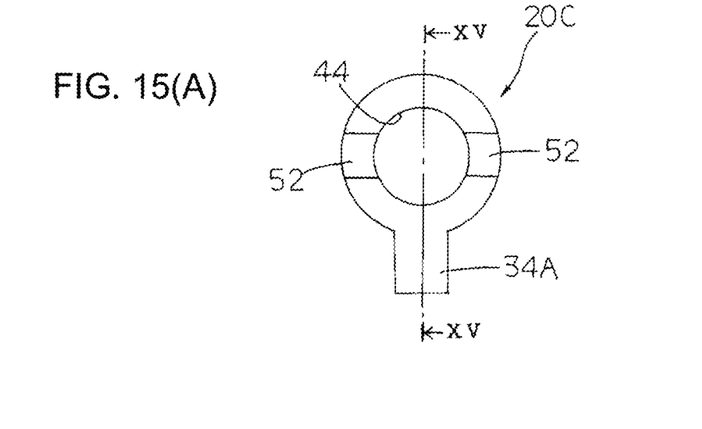
FIG. 15(A) is a rear view of a lubrication plug.
Figure 15B:
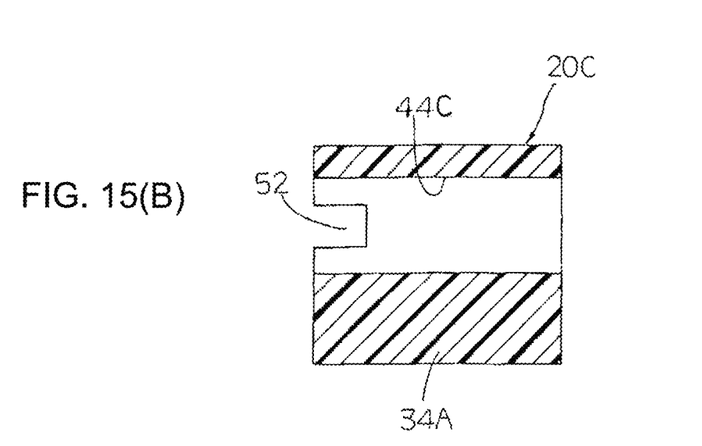
FIG. 15(B) is a sectional view of the lubrication plug taken along line XV-XV of FIG. 15(A)

A further embodiment of the lubrication plug according to the present invention is a lubrication plug 20C shown in FIGS. 15A and 15B. The lubrication plug 20C has a positioning protrusion 34A to be fitted into the slit 31 for positioning the lubrication plug 20C at a predetermined position of the end cap body 5. The lubrication plug 20C is positioned in relation to the end cap 4 by fitting the positioning protrusion 34A into the slit 31 formed in the end cap body 5. As compared with the case of use of the lubrication plug 20A or 20B having the positioning protrusions 34, as a result of use of the lubrication plug 20C of the present embodiment, the sectional area of a flow channel of the lubrication groove 32 formed in the end cap body 5 remains unchanged, whereby lubricant can be supplied smoothly. Also, in the case of use of the lubrication plug 20C, since the hole 44C has a straight shape, preferably, the end seal 7B shown in FIGS. 16A to 16C is used.

Figure 10:
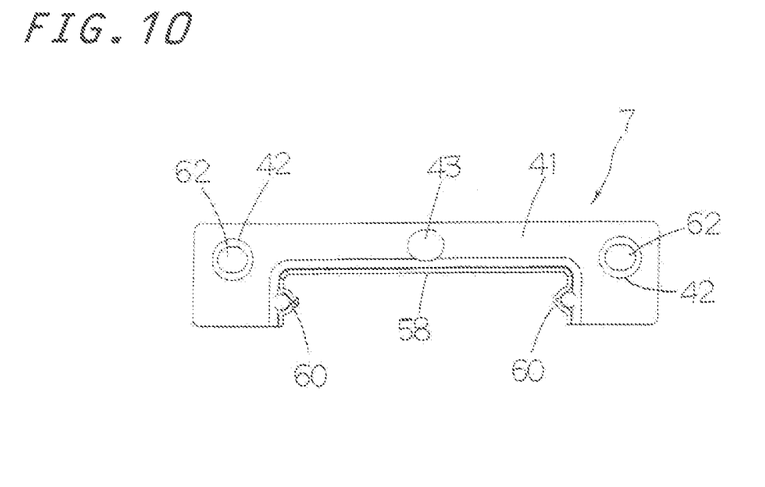
FIG. 10 is a front view showing an example of an end seal in the curvilinear rolling guide unit of FIG. 1.
Figure 11:
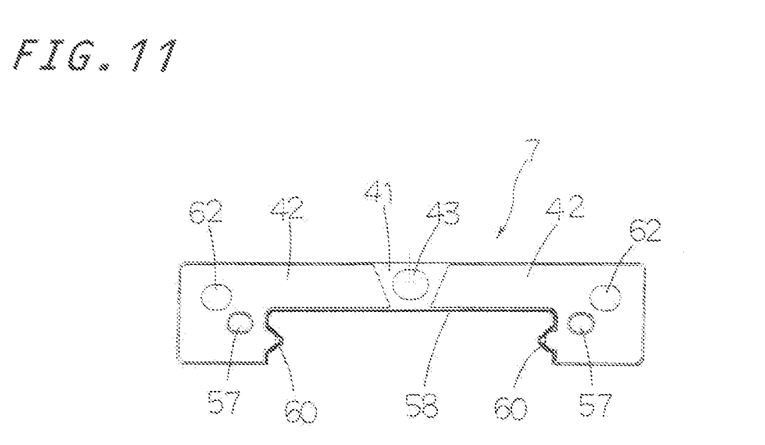
FIG. 11 is a rear view of the end seal of FIG. 10 as viewed from the carriage side.
Figure 12A:
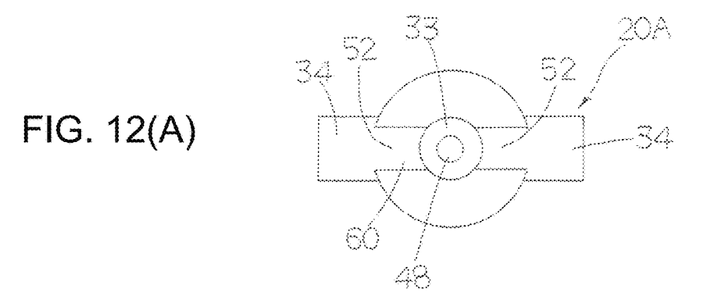
FIG. 12(A) is a rear view of a lubrication plug.
Figure 12B:
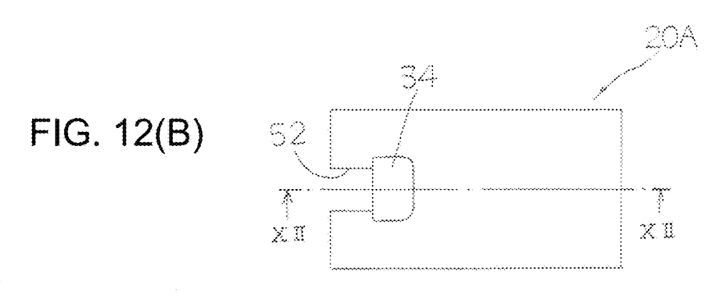
FIG. 12(B) is a side view of the lubrication plug.
Figure 12C:
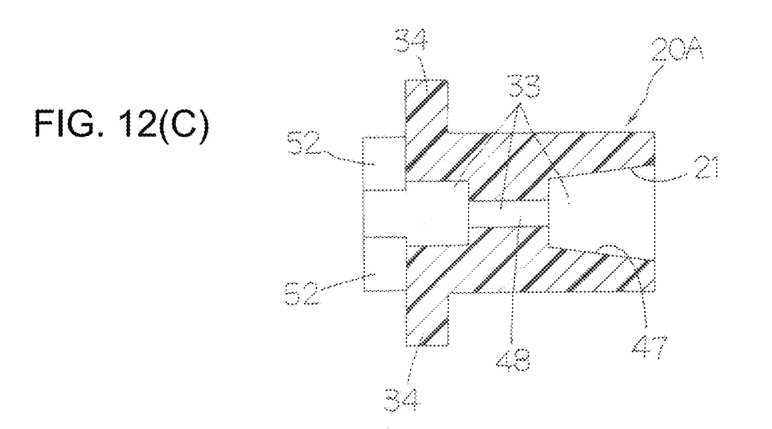
FIG. 12(C) is a sectional view of the lubrication plug taken along line XII-XII of FIG. 12(B)
Figure 13:
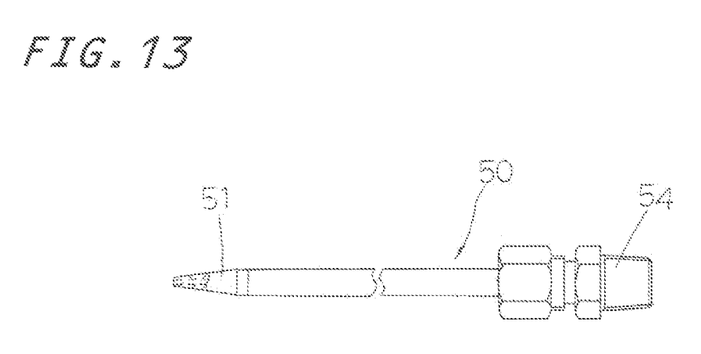
FIG. 13 is a side view of a lubricator having a nozzle to be inserted into the lubrication opening of the lubrication plug.

As shown in FIGS. 10 and 11, the end seal 7 is composed of the seal member 41 and a pair of metallic cores 42. The end seal 7 has the lip 58 for sealing a gap between the end seal 7 and the upper surface 23 of the guide rail 1 and has the through hole 43 formed in its central region at a position corresponding to the lubrication hole 22. The paired metallic cores 42 are separated from each other in the central region of the seal member 41 and fixedly attached to the seal member 41. The through hole 43 formed in the seal member 41 of the end seal 7 allows the nozzle 51 of the lubricator 50 serving as a lubricant injector to be inserted therethrough. In the case of use of the end seal 7 shown in FIGS. 10 and 11, preferably, the lubrication plug 20A of the type shown in FIGS. 12A to 12C is used. FIG. 12C shows one embodiment of the hole 33 formed in the lubrication plug 20A. The hole 33 shown in FIG. 12C includes the taper hole portion 47 reducing in diameter toward the lubrication groove 32, and the pore part 48 smaller in diameter than the tip of the taper hole portion 47. The pore part 48 communicates with the lubrication groove 32. FIGS. 14A to 14C show another embodiment of the hole 33 formed in the lubrication plug 20A. The hole 33 shown in FIGS. 14A to 14C includes the straight hole 44 formed in the lubrication plug 20B, and the straight hole 44 communicates with the lubrication groove 32. According to the above embodiment of the curvilinear rolling guide unit, the slider 2 employs the end seals 7. However, for example, in the case of use of the slider 2 in a clean environment or the like, the slider 2 does not necessarily have the end seals 7.

Next will be described an embodiment of a method of loading rolling elements into the slider 2 in the curvilinear rolling guide unit according to the present invention. A method of loading the balls 10 into the slider 2 includes: disposing one end cap body 5 on the guide rail 1 in a straddling manner while expanding the width between the wing portions 26 of the one end cap body 5; fitting the lubrication plug 20A, 20B, or 20C into the lubrication hole 22 of the one end cap body 5; disposing the spacer 6 and the carriage 3 on the end surface 9 of the one end cap body 5 on the carriage 3 side; disposing the end seal 7 or 7B on the other end surface 8 of the one end cap body 5; fixing the one end cap 4 and the end seal 7 or 7B to the carriage 3; and loading the balls 10 serving as rolling elements into the load-carrying races 15, the turnaround passages 17, and the return passages 16. The method of loading the balls 10 into the slider 2 further includes: disposing the other end cap body 5 on the guide rail 1 in a straddling manner while expanding the width between the wing portions 26 of the other end cap body 5; fitting the lubrication plug 20A, 20B, or 20C into the lubrication hole 22 of the other end cap body 5; loading the balls 10 serving as rolling elements into the turnaround passages 17 of the other end cap body 5; disposing the spacer 6 on the one end surface 9 of the other end cap body 5; disposing the end seal 7 or 7B on the other end surface 8 of the other end cap body 5; and fixing the other end cap 4 and the end seal 7 or 7B to the carriage 3. In the case where the end seals 7 or 7B are not disposed on the end surfaces 8 of the end caps 4, a step of disposing the end seals 7 or 7B is eliminated. Specifically, a method of loading the balls 10 into the slider 2 according to the present invention includes: disposing one end cap body 5 on the guide rail 1 in a straddling manner while expanding the width between the wing portions 26 of the one end cap body 5; fitting the lubrication plug 20A, 20B, or 20C into the lubrication hole 22 of the one end cap body 5; disposing the spacer 6 and the carriage 3 on the end surface 9 of the one end cap body 5 on the carriage 3 side; loading the balls 10 into the return passages 16, the load-carrying races 15, the turnaround passages 17 of the one end cap body 5; disposing the other end cap body 5 on the guide rail 1 in a straddling manner while expanding the width between the wing portions 26 of the other end cap body 5; fitting the lubrication plug 20A, 20B, or 20C into the lubrication hole 22 of the other end cap body 5; loading the balls 10 into the turnaround passages 17 of the other end cap body 5; disposing the spacer 6 on the one end surface 9 of the other end cap body 5; and fixing the other end cap 4 to the carriage 3.

What is claimed is:

1. A curvilinear rolling guide unit comprising:
an elongated guide rail having first raceway grooves formed in an inner longitudinal side and an outer longitudinal side; and a slider which straddles the guide rail and slides thereon via a plurality of rolling elements,
the slider having a carriage which has second raceway grooves formed therein and facing the first raceway grooves of the guide rail and has return passages formed therein and extending along load-carrying races formed between the first raceway grooves and the second raceway grooves, end caps attached to respective opposite end surfaces of the carriage and each having a pair of turnaround passages formed therein and establishing communication between the load-carrying races and the return passages, and the plurality of rolling elements rolling in circulation passages each composed of the load-carrying race, the return passage, and a pair of the turnaround passages,
wherein each of the end caps comprises:
an end cap body which includes an upper portion located above the guide rail, and wing portions extending downward from opposite longitudinal side portions of the upper portion along the inner longitudinal side and the outer longitudinal side of the guide rail, the wing portions having scooping portions protruding inward in a width direction and outer wall surfaces of the turnaround passages; and
a spacer in contact with a carriage-side end surface of the end cap body and having inner wall surfaces of the turnaround passages,
wherein the end cap body has a lubrication hole formed in a central region of the upper portion, a lubrication groove establishing communication between the lubrication hole and the turnaround passages, and a slit formed in the upper portion and extending from the lubrication hole to an under surface of the upper portion; and
a lubrication plug fitted into the lubrication hole formed in the end cap body to close lubrication hole and the slit extending from the lubrication hole, the lubrication plug having a lubrication passage defined therein communicating with the lubrication groove.

2. A curvilinear rolling guide unit according to claim 1, wherein the lubrication plug has a cylindrical outer circumference capable of being fitted into the lubrication hole formed in the end cap body.

3. A curvilinear rolling guide unit according to claim 1, wherein the lubrication plug has a positioning protrusion fitted into the lubrication groove or the slit formed in the end cap body for positioning the lubrication plug at a predetermined position of the end cap body.

4. A curvilinear rolling guide unit according to claim 1, wherein the lubrication passage formed in the lubrication plug includes a lubrication opening formed in one end surface of the lubrication plug, a hole extending through the lubrication plug from the lubrication opening to the other end surface of the lubrication plug, and a pair of lubrication grooves extending from a portion of the hole located at the other end surface to the outer circumference and communicating with the lubrication groove formed in the end cap body, and
the other end surface of the lubrication plug is in contact with an end surface of the spacer of the end cap, whereby a spacer-side end of the hole is sealed to thereby define the lubrication passage.

5. A curvilinear rolling guide unit according to claim 4, wherein the hole formed in the lubrication plug is formed of a taper hole portion reducing in diameter toward the lubrication groove, and a pore part smaller in diameter than a tip of the taper hole portion.

6. A curvilinear rolling guide unit according to claim 4, wherein the hole formed in the lubrication plug is formed straight.

7. A curvilinear rolling guide unit according to claim 1, wherein the spacer of the end cap is disposed in contact with the end cap body, thereby sealing the lubrication hole and the lubrication groove formed in the end cap body and defining the lubrication passage.

8. A curvilinear rolling guide unit according to claim 1, wherein each of end seals disposed on the respective end surfaces of the end caps comprises a seal member having a through hole formed therein at a position corresponding to the lubrication hole, and a metallic core halved at a position of the through hole and fixedly attached to the seal member.

9. A curvilinear rolling guide unit according to claim 1, wherein
the guide rail is formed into an arc shape or an endless ring shape;
the carriage is formed in accordance with the shape of the guide rail such that a dimension measured on an outer side along a longitudinal direction is longer than a dimension measured on an inner side along the longitudinal direction; and
the end cap is formed such that a dimension of the upper portion measured on the inner side along the longitudinal direction is equal to a dimension of the upper portion measured on the outer side along the longitudinal direction and such that the wing portion on the inner side and the wing portion on the outer side have the same dimension measured along the longitudinal direction.

10. A method of loading rolling elements into the slider of the curvilinear rolling guide unit according to claim 1, comprising:
disposing one of the end cap bodies on the guide rail in a straddling manner while expanding a width between the wing portions of the one end cap body;
fitting the lubrication plug into the lubrication hole of the one end cap body;
disposing the spacer and the carriage on the carriage-side end surface of the one end cap body;
loading the rolling elements into the return passages, the load-carrying races, and the turnaround passages of the one end cap body;
disposing the other end cap body on the guide rail in a straddling manner while expanding a width between the wing portions of the other end cap body;
fitting the lubrication plug into the lubrication hole of the other end cap body;
loading the rolling elements into the turnaround passages of the other end cap body;

disposing the spacer on the carriage-side end surface of the other end cap body; and fixing the other end cap to the carriage.

11. A method of loading rolling elements into the slider according to claim 10, wherein in the case where end seals are disposed on the end surfaces of the end caps, one of the end seals is disposed on the other end surface of the one end cap body, and the one end cap and the one end seal are disposed on the carriage; and the other end seal is disposed on the other end surface of the other end cap body, and the other end cap and the other end seal are disposed on the carriage.

* * * * *